US012051385B2

(12) United States Patent
Li et al.

(10) Patent No.: US 12,051,385 B2
(45) Date of Patent: Jul. 30, 2024

(54) ARRAY SUBSTRATE, DISPLAY PANEL AND DISPLAY DEVICE

(71) Applicant: HKC CORPORATION LIMITED, Shenzhen (CN)

(72) Inventors: Haibo Li, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/362,052

(22) Filed: Jul. 31, 2023

(65) Prior Publication Data

US 2024/0212644 A1 Jun. 27, 2024

(30) Foreign Application Priority Data

Dec. 27, 2022 (CN) ......................... 202211691010.5

(51) Int. Cl.
*G09G 3/36* (2006.01)

(52) U.S. Cl.
CPC ......... *G09G 3/3677* (2013.01); *G09G 3/3614* (2013.01); *G09G 3/3688* (2013.01); *G09G 2300/0408* (2013.01); *G09G 2300/0823* (2013.01); *G09G 2320/0247* (2013.01); *G09G 2330/021* (2013.01)

(58) Field of Classification Search
CPC ......... G09G 3/3614; G09G 2300/0452; G09G 2310/0254; G09G 3/3648; G09G 3/3688
See application file for complete search history.

(56) References Cited

U.S. PATENT DOCUMENTS

2017/0248828 A1* 8/2017 Du ........................ G09G 3/3614
2021/0408060 A1* 12/2021 Ji ......................... G09G 3/3648

FOREIGN PATENT DOCUMENTS

| | | | |
|---|---|---|---|
| CN | 106094380 | A | 11/2016 |
| CN | 106249489 | A | 12/2016 |
| CN | 110208995 | A | 9/2019 |
| CN | 111123598 | A | 5/2020 |
| CN | 113781972 | A | 12/2021 |
| CN | 114815420 | A | 7/2022 |
| CN | 115755449 | A | 3/2023 |

* cited by examiner

*Primary Examiner* — Koosha Sharifi-Tafreshi
(74) *Attorney, Agent, or Firm* — Maier & Maier, PLLC

(57) ABSTRACT

An array substrate, a display panel and a display device. The array substrate includes multiple pixel groups arranged in an array, each pixel group includes two sub pixel groups, each sub pixel group includes two pixels, and each pixel includes multiple sub-pixels. The sub-pixels in a same pixel group are located in a same row. Pixel groups in the same row are correspondingly connected to two adjacent scan lines, and pixel groups in different row are connected to different scan lines. In a same sub pixel group, sub-pixels having a same color and opposite polarities are connected to a same source driver IC, and are connected to different scan lines. In a same pixel group, sub-pixels having a same color and opposite polarities in different sub pixel groups are connected to the same scan line.

20 Claims, 7 Drawing Sheets

ARRAY SUBSTRATE, DISPLAY PANEL AND DISPLAY DEVICE

CROSS-REFERENCE TO RELATED APPLICATION

Pursuant to 35 U.S.C. § 119 and the Paris Convention, this application claims the benefit of Chinese Patent Application No. 202211691010.5 filed on Dec. 27, 2022, the content of which is incorporated herein by reference.

TECHNICAL FIELD

The present application relates to the field of display technology, and in particular, to an array substrate, a display panel and a display device.

BACKGROUND

The statements provided herein are merely background information related to the present application, and do not necessarily constitute any prior arts. With the continuous maturity of display technology, the display device is increasingly applied to various fields. In a display device, an integrated circuit chip (IC) is usually required to provide image processing and drive signals for pixel circuits of each pixel unit in the display device. Dual gate drive architectures are commonly used in display devices to save production costs by means of reducing the number of source driver ICs. However, this drive architecture will lead to increased power consumption of the display device.

SUMMARY

In view of this, the present application provides an array substrate, a display panel and a display device to reduce the power consumption of the display device while saving the cost of production.

To achieve the above objectives, according to a first aspect, an embodiment of the present application provides an array substrate, including: multiple pixel groups arranged in an array, each pixel group includes two sub pixel groups, each sub pixel group includes two pixels, each pixel includes multiple sub-pixels. The sub-pixels in a same pixel group are located in a same row. Pixel groups in the same row are correspondingly connected to two adjacent scan lines, and pixel groups in different rows are connected to different scan lines.

In the same sub pixel group, sub-pixels of a same color have opposite polarities and are connected to a same source driver IC, and the sub-pixels of the same color are connected to different scan lines.

In the same pixel group, sub-pixels of a same color but opposite polarities in different sub pixel groups are connected to a same scan line.

As an optional implementation of the embodiment of the present application, during displaying, scan lines in odd rows are driven before scan lines in even rows being driven, or the scan lines in even rows are driven before the scan lines in odd rows being driven.

As an optional implementation of the embodiment of present application, the scan lines in odd rows and the scan lines in even rows are driven in a positive sequence.

As an optional implementation of the embodiment of the present application, the scan lines in odd rows are driven in a positive sequence, and the scan lines in even rows are driven in an inverted sequence.

As an optional implementation of the embodiment of the present application, the sub-pixels of the same color in the same sub pixel group, after being connected via an internal data line, are connected to a corresponding source driver IC via the same data line.

As an optional implementation of the embodiment of the present application, for a same driver IC, a polarity of a data voltage output to drive a scan line in an odd row is opposite to that of a data voltage output to drive a scan line in an even row.

As an optional implementation of the embodiment of the present application, each pixel includes a red sub-pixel, a blue sub-pixel and a green sub-pixel.

As an optional implementation of the embodiment of the present application, adjacent sub-pixels in each sub pixel group are connected to different scan lines.

According to a second aspect, an embodiment of the present application provides a display panel, including a color film substrate and the array substrate as described in the first aspect or any one of the implementations of the first aspect, where the color film substrate and the array substrate are arranged opposite to each other.

According to a third aspect, an embodiment of the present application provides a display device, including a printed circuit board and the display panel described in the second aspect or any one of the implementations of the second aspect.

The array substrate, the display panel or the display device provided by the embodiment of the present application includes multiple pixel groups arranged in an array, each pixel group includes two sub pixel groups, each sub pixel group includes two pixels, each pixel includes multiple sub-pixels, the sub-pixels in the same pixel group are located in a same row. The pixel groups in the same row are connected correspondingly to two adjacent scan lines, and different rows of pixel groups are connected to different scan lines. In the same sub pixel group, the sub-pixels of the same color have opposite polarities and are connected to the same source driver IC, and the sub-pixels of the same color are connected to different scan lines. In the same pixel group, the sub-pixels of the same color but opposite polarities in different sub pixel groups are connected to the same scan line. In the above technical schemes, the sub-pixels of the same color in the same sub pixel group are connected to a same source driver IC, such that one source driver IC can control two columns of sub-pixels, so that the number of source drive ICs in the display device can be reduced, which then can save the cost of production. The pixel groups in the same row are correspondingly connected to two adjacent scan lines. The sub-pixels of the same color in the same sub pixel group have opposite polarities and are connected to different scan lines (that is, one is connected to an odd row of scan line, one is connected to an even row of scan line). The sub-pixels of the same color but opposite polarities in different sub pixel groups of the same pixel group are connected to the same scan line, in this way, one source driver IC is corresponded to two columns of sub-pixels of the same color (located in the same sub pixel group), sub-pixels in one column are connected to the scan line in an odd row, and sub-pixels in the other column are connected the scan line in an even row. Thus, during displaying, by means of driving the scan lines in odd rows first and then driving the scan lines in even rows (or driving the scan lines in even rows first and then driving the scan lines in odd rows), so that the polarity of the voltage output from the source driver IC is not reversed when the scan lines in odd rows are driven, and the voltage of an opposite polarity (which is also not reversed) is output from the source driver IC when the scan lines in even rows are driven. The polarity of the voltage output from the source driver IC is reversed only when the scan line to be driven is changed from an odd row to an even row (or from the even row to the odd row), that is, the polarity of the voltage output from each source driver IC is only reversed once in one frame time, thereby reducing the power consumption of the display device, which also reduces the requirements for thin film transistors connected to the data lines, and broadening the selection range of the thin film transistors.

DETAILED DESCRIPTION

With the continuous maturity of display technology, the display technology has been widely used in display devices such as television, mobile phones. In the display device, a driver IC is required to provide image processing and drive signals for a pixel circuit of each pixel in the display device.

The driver IC of the display device may usually include a gate driver IC and a source driver IC. The cost of the gate driver IC will be much lower than that of the source driver IC. Due to the fierce competition in the display industry, the dual gate-driven architecture is commonly used by display panel manufacturers to reduce the production cost of display devices by means of increasing the gate driver IC and reducing the source driver IC.

However, the dual gate-driven architecture will cause data lines connected to the source driver IC to switch between positive and negative polarity voltages constantly, which leads to increased power consumption of the display device.

In view of this, the present application provides an array substrate, a display panel, and a display device to reduce the power consumption of the display device on the basis of reducing the source driver IC.

Embodiments of the present application are described here in below with reference to the drawings of the embodiments of the present application. Terms used in the detailed description of the embodiments of the present application are only intended to interpret specific embodiments of the present application, instead of limiting the present application. The following specific embodiments may be combined with each other, and the same or similar concepts or processes may not be repeated in some embodiments.

Figure 1:
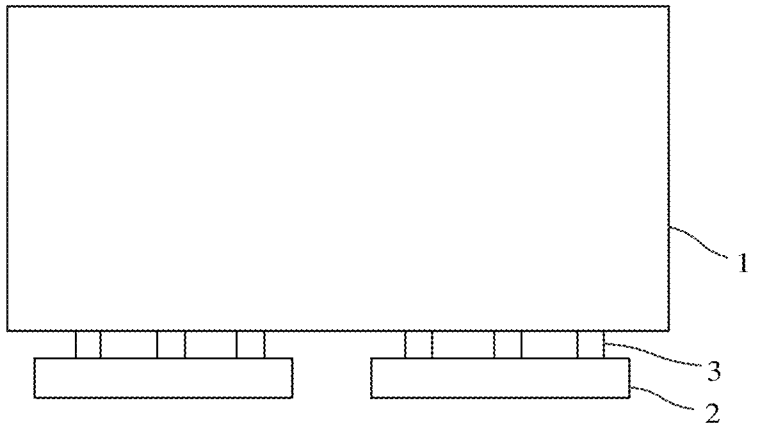
FIG. 1 is a schematic diagram of a display device in accordance with an embodiment of the present application.

FIG. 1 is a top view of a display device in accordance with an embodiment of the present application. As shown in FIG. 1, the display device provided in the embodiment of the present application may include a display panel 1 and a printed circuit board (PCB) 2.

PCB 2 may be fixed on one side of the display panel 1 by a chip on flex (COF) 3.

It can be understood that PCB 2 may also be fixed on multi-sides of the display panel 1, which will not be specifically limited inhere.

The display device provided by the embodiments of the present application may be a backlit display device, such as a thin film transistor liquid crystal display (TFT-LCD), etc., or may also be a non-backlit display device, such as an organic light emitting diode (OLED) display device, etc. The following exemplary illustrations will take the backlit display device as an example for all display device provided in embodiments of the present application.

Figure 2:
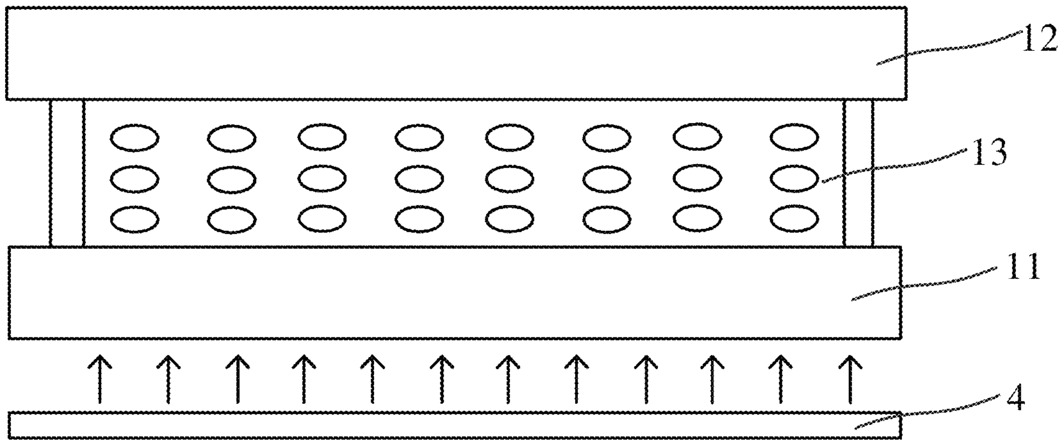
FIG. 2 is a schematic diagram of a display panel in accordance with an embodiment of the present application.

FIG. 2 is a schematic diagram of a display panel in accordance with an embodiment of the present application. As shown in FIG. 2, the display panel 1 provided by the embodiment of the present application may include an array substrate 11, a color film substrate 12, and a liquid crystal layer 13.

The array substrate 11 and the color film substrate 12 are arranged opposite to each other. The liquid crystal layer 13 is located between the array substrate 11 and the color film substrate 12.

A backlight source 4 of the display device provided by the embodiment of the present application may be located on a side of the array substrate away from the color film substrate, and the backlight source 4 is used to provide backlight for the display panel.

Figure 3:
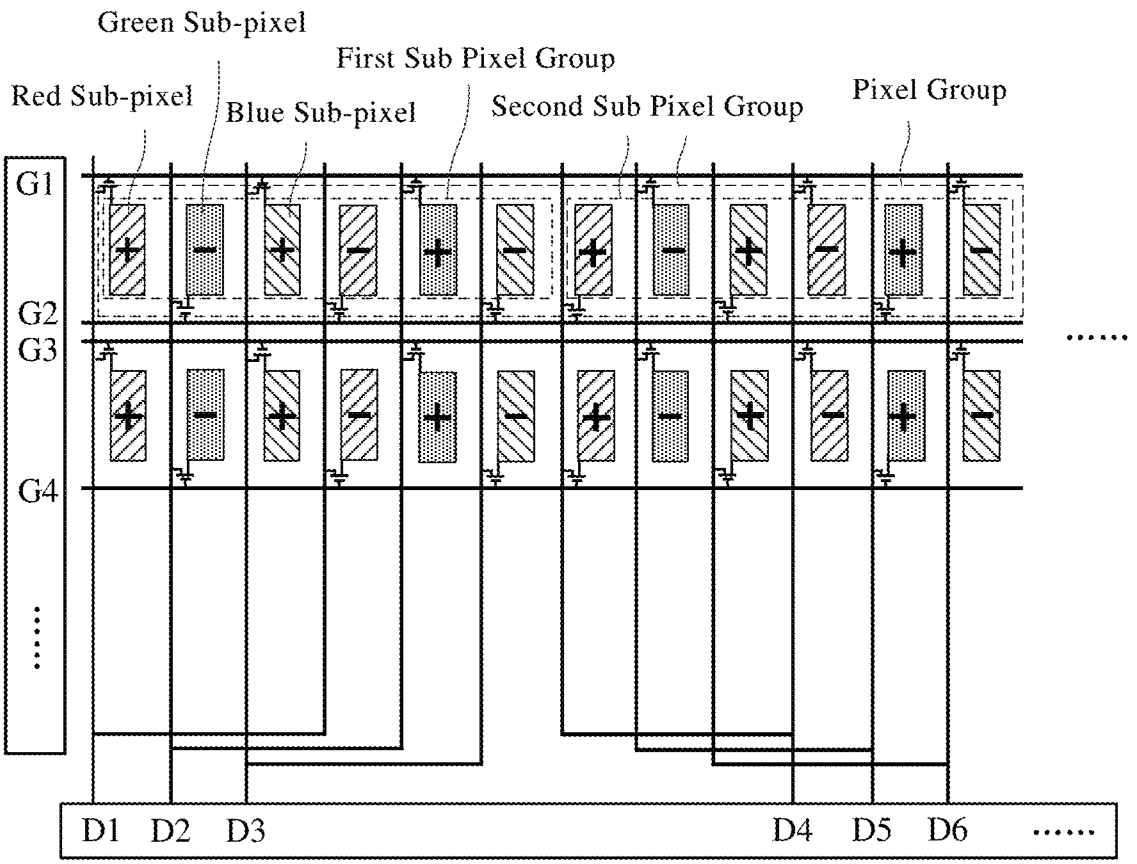
FIG. 3 is a schematic diagram of an array substrate in accordance with an embodiment of the present application.

FIG. 3 is a schematic diagram of an array substrate in accordance with an embodiment of the present application. As shown in FIG. 3, the array substrate may include multiple pixel groups arranged in an array. Each pixel group may include two sub pixel groups, each sub pixel group may include two pixels. Each pixel may include multiple sub-pixels of different colors. In the following embodiments, each pixel includes three sub-pixels i.e., a red sub-pixel, a green sub-pixel, and a blue sub-pixel, as an example for exemplary description.

The three sub-pixels of red, green, and blue in the same pixel group are located in the same row, and adjacent sub-pixels are connected to different scan lines. For example, for two adjacent sub-pixels in the first sub pixel group, one is connected to a scan line G1 through a TFT connection, the other one is connected to a scan line G2 through the TFT connection. The pixel groups in the same row are correspondingly connected to two adjacent scan lines, and different rows of pixels are connected to different scan lines. For example, each pixel group in a first row are correspondingly connected to the scans line G1 and G2. and each pixel group in a second row are correspondingly connected to the scan lines G3 and G4.

In the same sub pixel group, the sub-pixels of the same color have opposite polarities, and are connected to the same source driver IC. The sub-pixels of the same color are connected to different scan lines. For example, in the first sub pixel group, the red sub-pixel in the 1-st column having a positive polarity is connected to the scan line G1, the red sub-pixel in the 4-th column having a negative polarity is connected to the scan line G2, and the red sub-pixels in these two columns are connected to a source driver IC D1. The green sub-pixel in the 2-nd column having a negative polarity is connected to the scan line G2, and the green sub-pixel in the 5-th column having a positive polarity is connected to the scan line G1, and the blue sub-pixels in these two columns are connected to a source driver IC D2. The blue sub-pixel in the 3-rd column having a positive polarity is connected to the scan line G1, the blue sub-pixel in the 6-th column having a negative polarity is connected to the scan line G2, and the blue sub-pixels in these two columns are connected to a source driver IC D3. In this way, each source driver IC can control two columns of sub-pixels, so that the number of source driving ICs in the display device can be reduced, thereby saving production costs.

In a same pixel group, the sub-pixels in different sub pixel group having the same color but opposite polarities are connected to a same scan line. For example, the red sub-pixel in a 1-st column of the first sub pixel group has a positive polarity, the red sub-pixel in a 4-th column of the second sub pixel group has a negative polarity. The red sub-pixel in the 1-st column of the first sub pixel group and the red sub-pixel in the 4-th column of the second sub pixel group are connected to the scan line G1. The green sub-pixel in a 2-nd column of the first sub pixel group has a negative polarity, the green sub-pixel in a 5-th column of the second sub pixel group has a positive polarity. The green sub-pixel in the 2-nd column of the first sub pixel group and the green sub-pixel in the 5-th column of the second sub pixel group are connected to the scan line G2. In this way, for the two columns of sub-pixels of the same color driven by a same source IC, sub-pixels in one column are connected to scan lines in odd rows, and sub-pixels in the other column are connected to scan lines in even rows. Thus, during displaying, by means of driving the scan lines in odd rows first and then driving the scan lines in even rows (or driving the scan lines in even rows first and then driving the scan lines in odd rows), the polarity of voltage output from the source driver IC is enabled to be not reversed when the scan lines in odd rows are driven, and the voltage of an opposite polarity (not reversed) is output from the source driver IC when the scan lines in even rows are driven. The polarity of the voltage output from the source driver IC is reversed only when the scan lines to be driven are changed from the odd rows to the even rows (or from the even rows to the odd rows), that is, the polarity of the voltage output from each source driver IC is only reversed once in one frame time, which can reduce the power consumption of the display device.

In addition, when each scan line is driven, not only the sub-pixel of positive polarity is charged, but also the sub-pixel of negative polarity is charged (for example, in case that a red screen needs to be displayed, during a driving of the scan line G1, the red sub-pixel in the 1-st column is charged with a positive voltage by the source driver IC D1, the red sub-pixel in the 4-th column is charged with a negative voltage through the source drive IC D4), the positive or negative polarity of each pixel charging can be offset, thus reducing the probability of vertical screen, flicker and other phenomena caused by the failure offset of the positive and negative polarity of each pixel charging.

In addition, because the voltage output from each source driver IC does not need to be reversed constantly, this also reduces the requirements for TFT that connected to the data lines, so that the non-crystal silicon TFT with a low electron mobility can also achieve a good display effect and broaden a selection range of thin film transistors at corresponding positions.

It can be understood that each pixel group may include more sub pixel groups, and each sub pixel group may also include more pixels. In this embodiment, each pixel group includes two sub pixel groups, and each sub pixel group include two pixels are taken as examples for exemplary illustrations.

Figure 4:
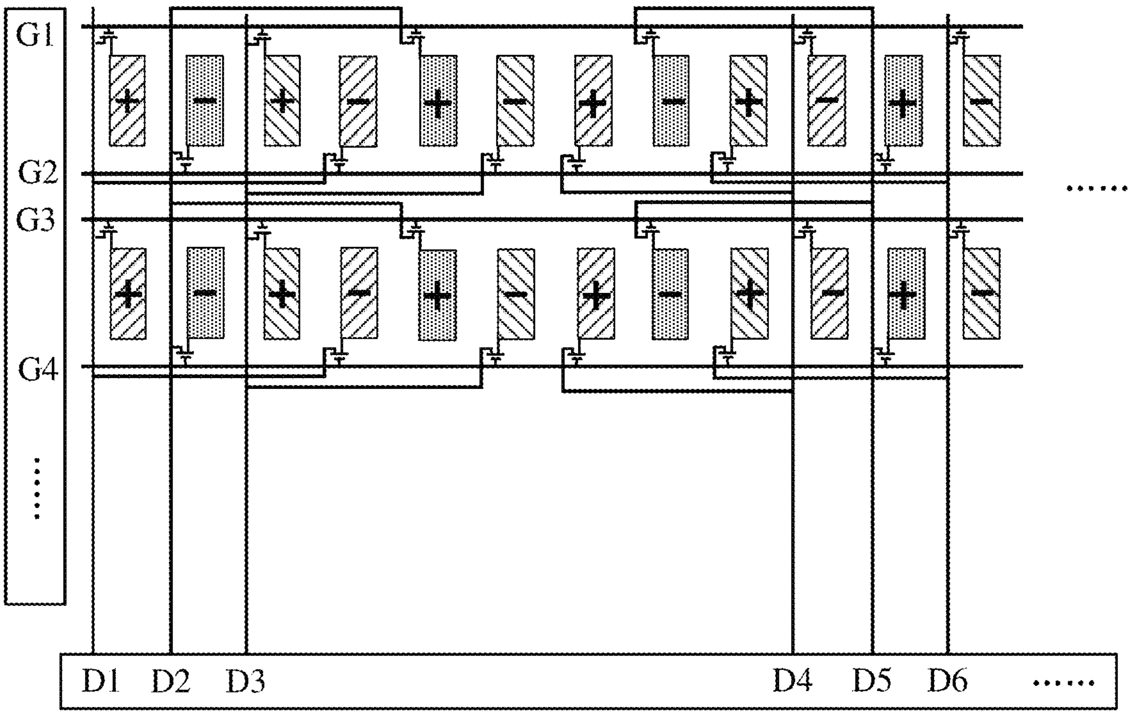
FIG. 4 is a schematic diagram of another array substrate in accordance with an embodiment of the present application.

FIG. 4 is a schematic diagram of another array substrate in accordance with an embodiment of the present application. As shown in FIG. 4, in the same sub pixel group, sub-pixels of the same color after being connected via an internal data line may be connected to the corresponding source driver IC via the same data line. For example, in the first sub pixel group, the red sub-pixel in the 4-th column is connected to the red sub-pixel in the 1-st column via the internal data line, and then connected to the source driver IC D1 via the same data line. The green sub-pixel in the 5-th column is connected to the green sub-pixel in the 2-nd column via the internal data line, and then connected to the source driver IC D2 via the data line. In this way, both the red sub-pixel in the 4-th column and the green sub-pixel in the 5-th column no longer need additional data lines to connect to the common electrode, which can reduce the load between the data line and the common electrode and thus further reduce the power consumption of the display device.

The following will explain a drive sequence of each scan line and each source driver IC in the display device by taking the display device displaying red screen as an example.

Figure 5:
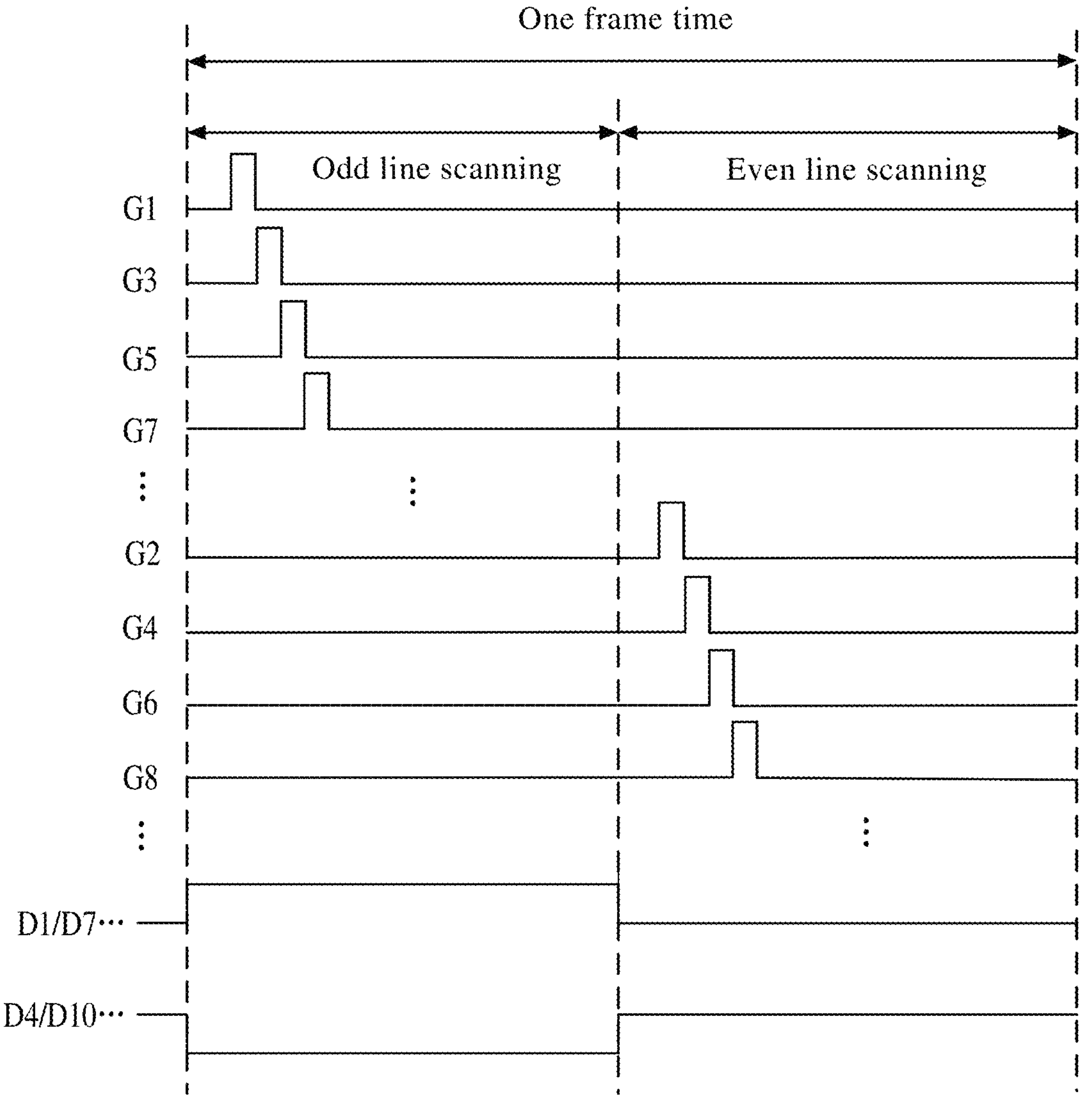
FIG. 5 is a timing-sequence diagram of scan lines and a source driver IC in accordance with an embodiment of the present application.
Figure 6:
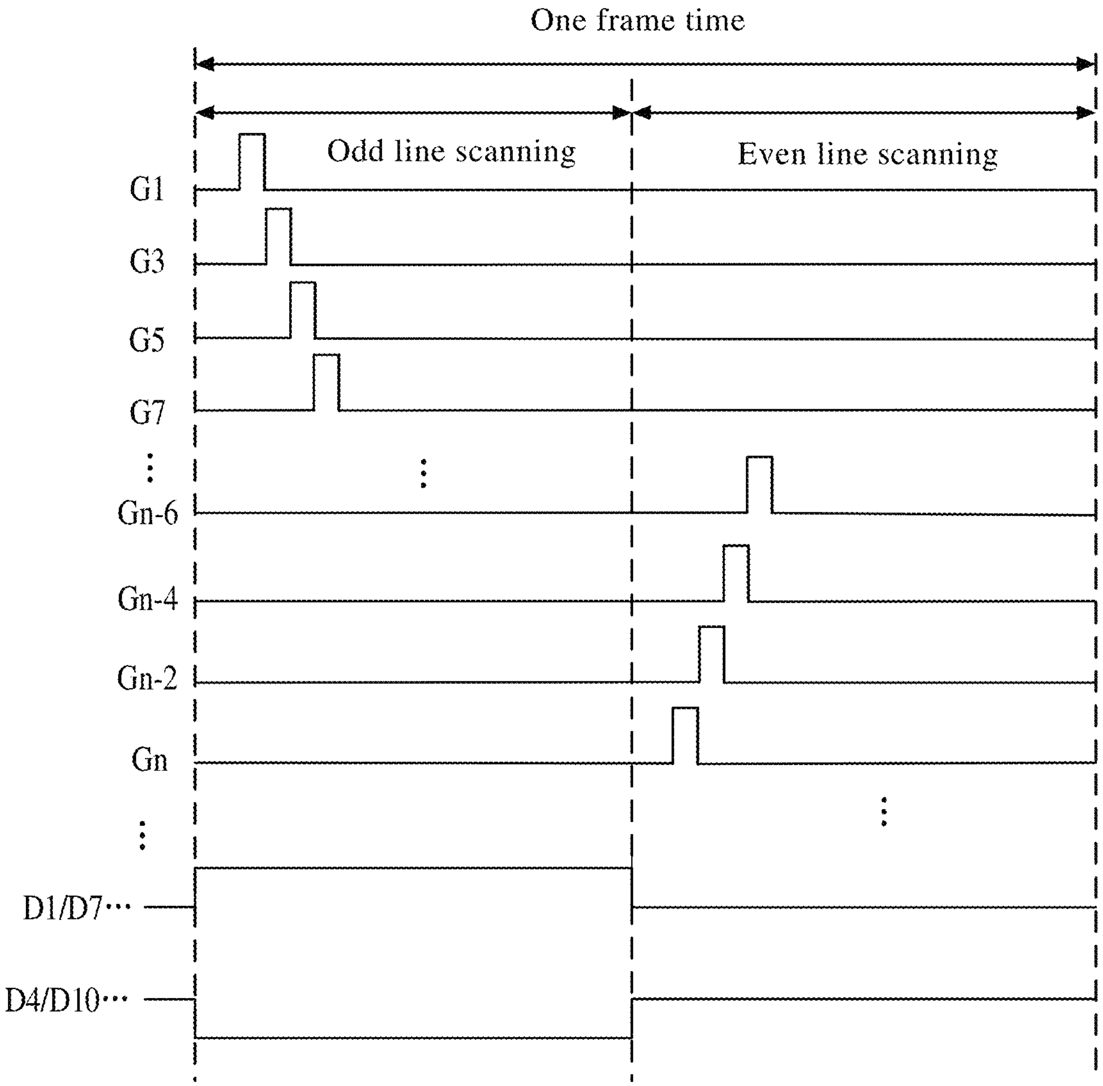
FIG. 6 is another timing-sequence diagram of the scan lines and the source driver IC in accordance with an embodiment of the present application.

FIG. 5 shows a timing-sequence diagram of the scan lines and source driver IC in accordance with an embodiment of the present application. As shown in FIG. 5, in one frame time, it may be that the scan line in odd rows is driven in order and then the scan lines in even rows are driven in order. It may also be that the scan lines in odd rows are driven in order, and then the scan lines in even rows are driven in inverted order, as shown in FIG. 6.

When driving the scan lines in odd rows, the source driver IC such as D1, D7 output voltages of positive polarity, the source drive IC such as D4, D10 output voltages of negative polarity. When driving the scan lines in even rows, the source driver IC such as D1, D7 output voltages of negative polarity, the source drive IC such as D4, D10 output voltages of positive polarity.

It can be understood that when driving the scan lines in all row, other driving sequence may also be adopted according to actual needs, such as: scan lines in the 1-st, 3-rd, 5-th, 7-th, and 9-th rows are driven first, then scan lines in the 2-nf, 4-th, 6-th, 8-th and 10-th rows are driven, and then scan lines in the 11-th, 13-th, 15-th, 17-th, and 19-th rows are driven, and then scan lines in the 12-th, 14-th, 16-th, 18-th, 20-th rows are driven, and so on. In the following embodiments, the scan lines in odd rows are driven first, and then the scan lines in even rows are driven, is taken as an example for exemplary description.

Figure 7:
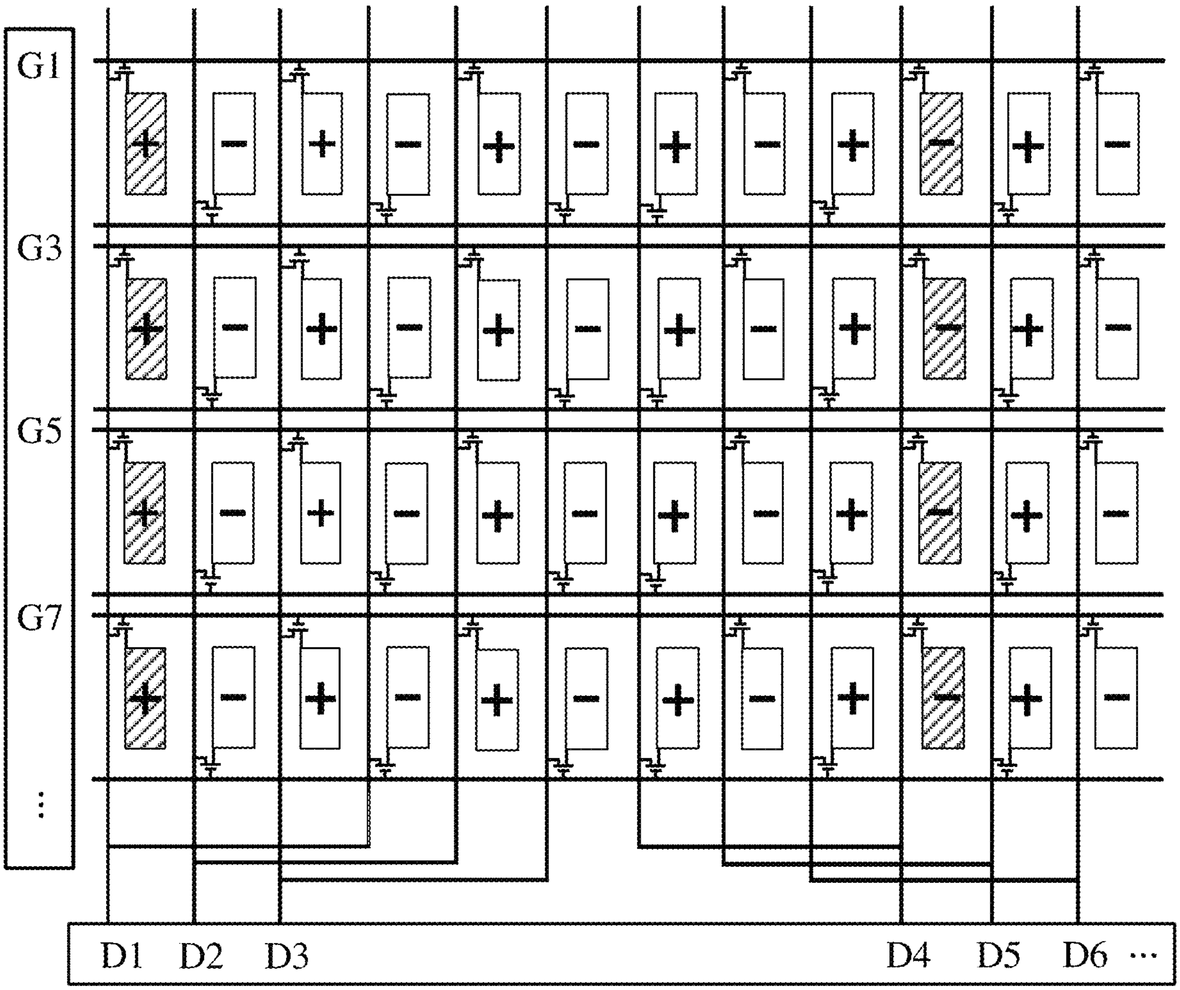
FIG. 7 is a schematic diagram of the array substrate when scan lines in odd rows are driven in accordance with an embodiment of the present application.

FIG. 7 is a schematic diagram of the array substrate when the scan lines in odd rows are driven in accordance with an embodiment of the present application. As shown in FIG. 7, when the scan lines in odd rows are driven, the source driver IC D1 outputs a voltage of positive polarity required for the 1-st column of red sub-pixels, the source driver IC D4 outputs a voltage of negative polarity required for the 10-th column of red sub-pixels, and so on. Each row has both red sub-pixels of positive polarity and red sub-pixel of negative polarity being charged, and the positive and negative polarity offset each other during charging.

Figure 8:
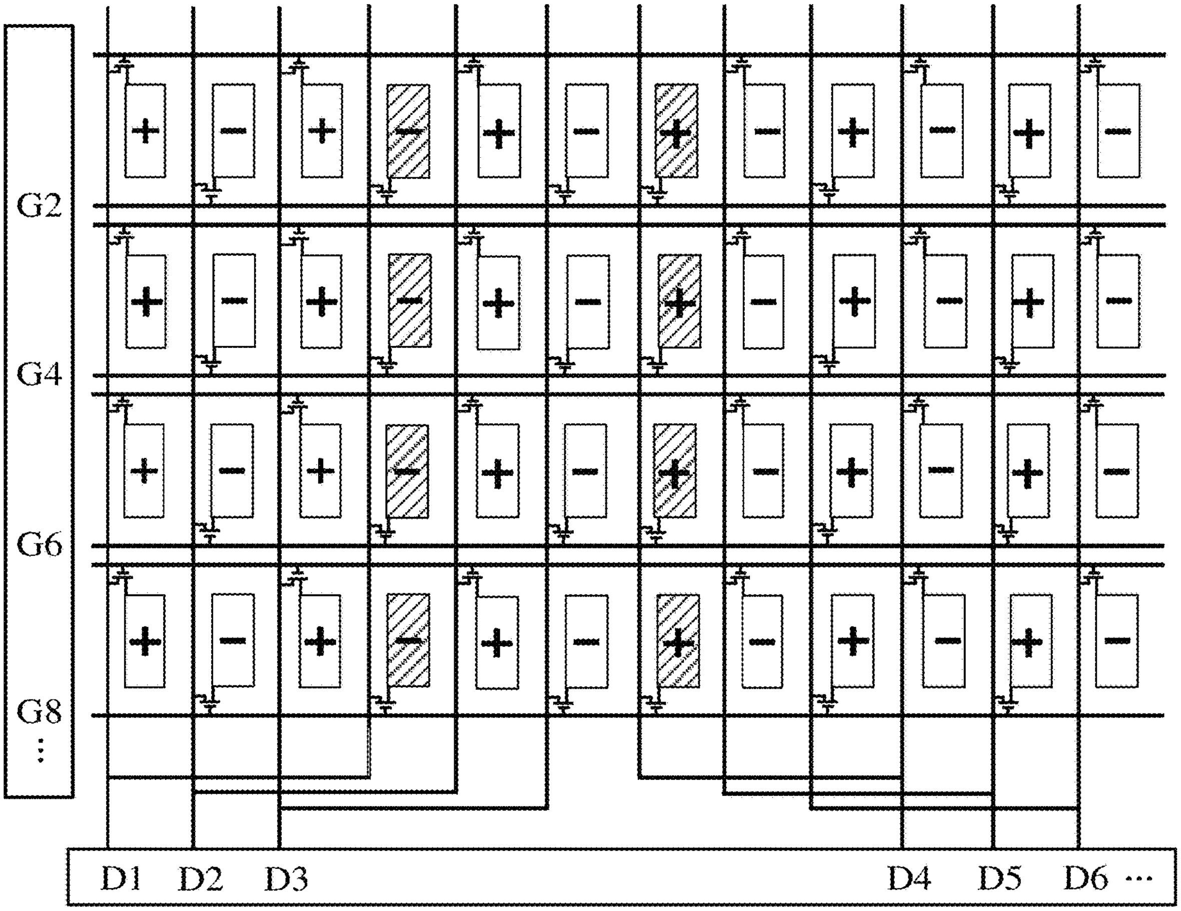
FIG. 8 is a schematic diagram of the array substrate when scan lines in even rows are driven in accordance with an embodiment of the present application.

FIG. 8 is a schematic diagram of the array substrate when the scan lines in even rows are driven in accordance with an embodiment of the present application. As shown in FIG. 8, when the scan lines in even rows are driven, the source driver IC D1 outputs a voltage of negative polarity required for the 4-th column of red sub-pixels, the source driver IC D4 outputs a voltage of positive polarity required for the 7-th column of red sub-pixels, and so on. Each row has both red sub-pixels of positive polarity and red sub-pixel of negative polarity being charged, and the positive and negative polarity offset each other during charging.

Figure 9:
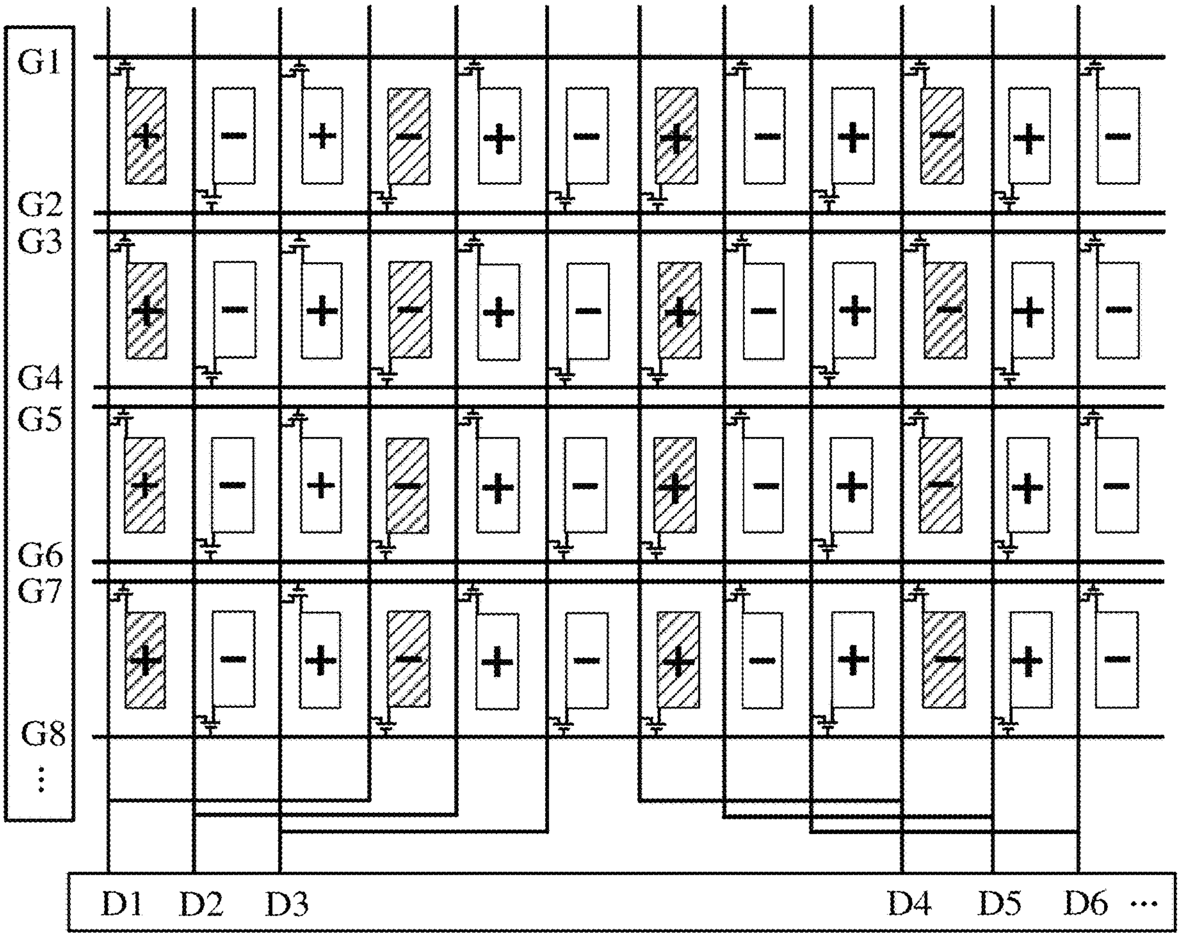
FIG. 9 is a schematic diagram of the array substrate after a driving of scan line in each row is completed in accordance with an embodiment of the present application.

FIG. 9 is a schematic diagram of the array substrate after a driving of scan line in each row is completed in accordance with an embodiment of the present application. As shown in FIG. 9, after the scan lines in all row are driven, a charging to each column of red sub-pixels is completed. The red sub-pixels of positive or negative polarity in each row are arranged at intervals, and the positive and negative polarity offset each other during charging, so that the probability of vertical screen, flicker and other phenomena caused by that the negative and positive polarity of each pixel cannot be offset, can be reduced.

The array substrate, the display panel or the display device provided by the embodiment of the present application includes multiple pixel groups arranged in an array, each pixel group includes two sub pixel groups, each sub pixel group includes two pixels, each pixel includes multiple sub-pixels, the sub-pixels in the same pixel group are located in a same row. The pixel groups in the same row are connected correspondingly to two adjacent scan lines, and different rows of pixel groups are connected to different scan lines. In the same sub pixel group, the sub-pixels of the same color have opposite polarities and are connected to the same source driver IC, and the sub-pixels of the same color are connected to different scan lines. In the same pixel group, the sub-pixels of the same color but opposite polarities in different sub pixel groups are connected to the same scan line. In the above technical schemes, the sub-pixels of the same color in the same sub pixel group are connected to a same source driver IC, such that one source driver IC can control two columns of sub-pixels, so that the number of source drive ICs in the display device can be reduced, which then can save the cost of production. The pixel groups in the same row are correspondingly connected to two adjacent scan lines. The sub-pixels of the same color in the same sub pixel group have opposite polarities and are connected to different scan lines (that is, one is connected to an odd row of scan line, one is connected to an even row of scan line). The sub-pixels of the same color but opposite polarities in different sub pixel groups of the same pixel group are connected to the same scan line, in this way, one source driver IC is corresponded to two columns of sub-pixels of the same color (located in the same sub pixel group), sub-pixels in one column are connected to the scan line in an odd row, and sub-pixels in the other column are connected the scan line in an even row. Thus, during displaying, by means of driving the scan lines in odd rows first and then driving the scan lines in even rows (or driving the scan lines in even rows first and then driving the scan lines in odd rows), so that the polarity of the voltage output from the source driver IC is not reversed when the scan lines in odd rows are driven, and the voltage of an opposite polarity (which is also not reversed) is output from the source driver IC when the scan lines in even rows are driven. The polarity of the voltage output from the source driver IC is reversed only when the scan line to be driven is changed from an odd row to an even row (or from the even row to the odd row), that is, the polarity of the voltage output from each source driver IC is only reversed once in one frame time, thereby reducing the power consumption of the display device, which also reduces the requirements for thin film transistors connected to the data lines, and broadening the selection range of the thin film transistors.

In the above embodiments, the descriptions of each embodiment have their own emphasis. For parts that are not detailed or recorded in one embodiment, references may be made to the relevant descriptions of other embodiments.

In addition, the size proportional relationship between the components in the drawings is only schematic, which does not reflect the actual size proportion relationship between each component.

In the description of the present application, a location or position relationship indicated by terms such as “center”, “vertical”, “horizontal”, “up”, “down”, “front”, “rear”, “left”, “right”, “vertical”, “horizontal”, “top”, “bottom”, “inner”, “outside”, etc., is based on the location or position relationship shown in the drawings, which is only intended to facilitate description of the present application and simplify the description, and is not intended to indicate or imply that the device or component referred to must have a particular orientation, be constructed and operated in a particular orientation and therefore shall not be construed as a limitation on the present application.

In the description of the present application, it should be noted that, unless otherwise expressly specified and qualified, the terms “installation”, “in connection with” and “be connected to” should be understood in a broad sense, it may be a fixed connection, a detachable connection, or an integrated connection: it may be a mechanical connection or an electrical connection; it may be directly connected, or indirectly connected through an intermediate medium, and may also be a connection within two elements. For persons of ordinary skills in the art, the specific meaning of the above term in the present application can be understood based on specific circumstances.

It should be understood that the term “include/comprise” when being used in the specification and claims of the present application, indicates an existence of the described feature, whole, step, operation, element, and/or component, but does not exclude the existence or addition of one or more other features, whole, steps, operations, elements, components and/or a combination thereof.

In the description of the present application, unless otherwise explained, the symbol “/” means that an object that is associated with the contents is a “or” relationship, for example, A/B may represent A or B. the expression of “and/or” in here is merely an associated relationship that describes the associated objects, which means that three relationships may be included. For example, A and/or B may include three cases, that is, A is existed alone, A and B are both existed, or B is existed alone, where A and B may be singular or plural.

In addition, in the description of the present application, unless otherwise explained, the wording “multiple” refers to two or more than two. The expression “at least one of the following items” or similar expression refers to any combination of these items, including any combination of singular or plural items. For example, at least one of A, B, or C may include: A, B, C, A-B, A-C, B-C, or A-B-C. Among them, A, B, C may be singular or plural.

In addition, in the description of the specification and claims of the present application, the terms “first”, “second”, and “third” are used to distinguish similar objects, and are not necessarily used to describe a particular order or sequence. It should be understood that the data used in this way may be swapped under appropriate circumstances so that the embodiment described here can be implemented in order other than what is illustrated or described here.

A reference to "one embodiment" or "some embodiments" described in the specification of the present application, etc., means to include in one or more embodiments of this application a particular feature, structure or characteristic described in conjunction with that embodiment. As a result, the statements "in one embodiment", "in some embodiments", "in some other embodiments", "in some other embodiments" which appear at different parts of this specification do not necessarily all refer to the same embodiments, but means "one or more but not all embodiments" unless otherwise specifically emphasized.

Finally, it should be noted that the above embodiments are intended only to illustrate the technical schemes of the present application and are not intended to limit the present application. Notwithstanding the detailed description of the present application by reference to the foregoing embodiments, persons of ordinary skills in the art should understand that the technical schemes in the foregoing embodiments may be modified, or some or all of the features thereof may be equivalently substituted; Such modifications or substitutions do not deviate the essence of the corresponding technical schemes from the scope of the technical scheme of each embodiment of the present application.

What is claimed is:

1. An array substrate, comprising:

multiple pixels arranged in an array, each pixel group comprising two sub-pixel groups, each sub pixel group comprising two pixels, each pixel comprising multiple sub-pixels, the sub-pixels in a same pixel group being located at a same row, pixel groups in the same row correspondingly connected to two adjacent scan lines, and pixel groups in different rows connected to different scan lines;

wherein, in a same sub pixel group, sub-pixels of a same color have opposite polarities and are connected to a same source driver integrated circuit (IC), and the sub-pixels of the same color are connected to different scan lines; and wherein, in a same pixel group, sub-pixels of a same color but opposite polarities in different sub pixel groups are connected to a same scan line.

2. The array substrate according to claim 1, wherein, when displaying, scan lines in odd rows are driven before scan lines in even rows being driven, or the scan lines in even rows are driven before the scan lines in odd rows being driven.

3. The array substrate according to claim 2, wherein the scan lines in odd rows and the scan lines in even rows are driven in a positive sequence.

4. The array substrate according to claim 2, wherein the scan lines in odd rows are driven in a positive sequence, and the scan lines in even rows are driven in an inverted sequence.

5. The array substrate according to claim 1, wherein the sub-pixels of the same color in the same sub pixel group, after being connected via an internal data line, are connected to a corresponding source driver IC via the same data line.

6. The array substrate according to claim 1, wherein a polarity of a data voltage output from a source driver IC to drive a scan line in an odd row is opposite to that of a data voltage output from the same source driver IC to drive a scan line in an even row.

7. The array substrate according to claim 1, wherein each pixel comprises a red sub-pixel, a blue sub-pixel, and a green sub-pixel.

8. The array substrate according to claim 1, wherein adjacent sub-pixels in each sub pixel group are connected to different scan lines.

9. A display panel, comprising:

a color film substrate; and an array substrate, comprising:

multiple pixels arranged in an array, each pixel group comprising two sub-pixel groups, each sub pixel group comprising two pixels, each pixel comprising multiple sub-pixels, the sub-pixels in a same pixel group being located at a same row, pixel groups in the same row correspondingly connected to two adjacent scan lines, and pixel groups in different rows connected to different scan lines;

wherein, in a same sub pixel group, sub-pixels of a same color have opposite polarities and are connected to a same source driver integrated circuit (IC), and the sub-pixels of the same color connected to different scan lines;

wherein, in a same pixel group, sub-pixels of a same color but opposite polarities in different sub pixel groups are connected to a same scan line; and wherein the color film substrate and the array substrate are arranged opposite to each other.

10. The display panel according to claim 9, wherein, when displaying, scan lines in odd rows are driven before scan lines in even rows being driven, or the scan lines in even rows are driven before the scan lines in odd rows being driven.

11. The display panel according to claim 10, wherein the scan lines in odd rows and the scan lines in even rows are driven in a positive sequence.

12. The display panel according to claim 10, wherein the scan lines in odd rows are driven in a positive sequence, and the scan lines in even rows are driven in an inverted sequence.

13. The display panel according to claim 9, wherein the sub-pixels of the same color in the same sub pixel group, after being connected via an internal data line, are connected to a corresponding source driver IC via the same data line.

14. The display panel according to claim 9, wherein a polarity of a data voltage output from a source driver IC to drive a scan line in an odd row is opposite to that of a data voltage output from the same source driver IC to drive a scan line in an even row.

15. The display panel according to claim 9, wherein each pixel comprises a red sub-pixel, a blue sub-pixel, and a green sub-pixel.

16. The display panel according to claim 9, wherein adjacent sub-pixels in each sub pixel group are connected to different scan lines.

17. A display device, comprising:

a printed circuit board; and a display panel, comprising:

a color film substrate; and an array substrate, comprising:

multiple pixels arranged in an array, each pixel group comprising two sub-pixel groups, each sub pixel group comprising two pixels, each pixel comprising multiple sub-pixels, the sub-pixels in a same pixel group being located at a same row, pixel groups in the same row correspondingly connected to two adjacent scan lines, and pixel groups in different rows connected to different scan lines:

wherein, in a same sub pixel group, sub-pixels of a same color have opposite polarities and are connected to a same source driver integrated circuit (IC), and the sub-pixels of the same color connected to different scan lines;

wherein, in a same pixel group, sub-pixels of a same color but opposite polarities in different sub pixel groups are connected to a same scan line; and wherein the color film substrate and the array substrate are arranged opposite to each other.

18. The display device according to claim 17, wherein, when displaying, scan lines in odd rows are driven before scan lines in even rows being driven, or the scan lines in even rows are driven before the scan lines in odd rows being driven.

19. The display device according to claim 18, wherein the scan lines in odd rows and the scan lines in even rows are driven in a positive sequence.

20. The display device according to claim 18, wherein the scan lines in odd rows are driven in a positive sequence, and the scan lines in even rows are driven in an inverted sequence.

* * * * *